(12) United States Patent
Fan et al.

(10) Patent No.: US 7,376,272 B2
(45) Date of Patent: May 20, 2008

(54) METHOD FOR IMAGE SEGMENTATION TO IDENTIFY REGIONS WITH CONSTANT FOREGROUND COLOR

(75) Inventors: Zhigang Fan, Webster, NY (US); Timothy W. Jacobs, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 941 days.

(21) Appl. No.: 10/866,850

(22) Filed: Jun. 14, 2004

(65) Prior Publication Data

US 2005/0275897 A1    Dec. 15, 2005

(51) Int. Cl.
*G06K 9/34*    (2006.01)

(52) U.S. Cl. .................. 382/173; 382/164; 382/176; 382/255; 382/274; 358/462; 358/2.1

(58) Field of Classification Search ................ 382/162, 382/164, 165, 166, 167, 173, 176, 180, 190, 382/232, 255, 274; 358/1.9, 464, 462, 2.1; 345/636
See application file for complete search history.

(56) References Cited

U.S. PATENT DOCUMENTS 5,767,978 A    6/1998 Revankar et al.

6,606,408 B1 * 8/2003 Kang et al. ............. 382/164
7,181,064 B1 * 2/2007 Stevens et al. .......... 382/165
2002/0146166 A1 * 10/2002 Rao et al. ................ 382/164
2002/0146167 A1 * 10/2002 Imamura et al. ........ 382/164

OTHER PUBLICATIONS

H. Cheng and Z. Fan; "Background Identification Based Segmentation and Multilayer Tree Based Representation of Document Images," Proceedings of IEEE International Conference on Image Processing, ICIP.
Z. Fan and M. Xu; a simple Segmentation Algorithm for Maxed Rater Contents Image Representation; Digital Imgaaing Technology Center; Xerox Corporation; Webster, NY; Jan. 2001.

* cited by examiner

*Primary Examiner*—Matthew C. Bella
*Assistant Examiner*—Ali Bayat
(74) *Attorney, Agent, or Firm*—Duane C. Basch; Basch & Nickerson LLP

(57) ABSTRACT

The present invention is a method for image segmentation to produce a mixed raster content (MRC) image with constant foreground layers. The invention extracts uniform text and other uniform color objects that carry detail information. The method includes four primary steps. First, the objects are extracted from the image. Next, the objects are tested for color consistency and other features to decide if they should be chosen for coding to the MRC foreground layers. The objects that are chosen are then clustered in color space. The image is finally segmented such that each foreground layer codes the objects from the same color cluster.

15 Claims, 3 Drawing Sheets

METHOD FOR IMAGE SEGMENTATION TO IDENTIFY REGIONS WITH CONSTANT FOREGROUND COLOR

This invention relates generally to image segmentation, and more particularly to a method to produce a mixed raster content (MRC) image having constant foreground layers.

BACKGROUND AND SUMMARY OF THE INVENTION

The present invention is directed to a method for image segmentation to produce a mixed raster content (MRC) image with constant foreground layers. The method extracts uniform text and other uniform color objects that carry detail information. The method includes four primary steps. First, the objects are extracted from the image. Next, the objects are tested for color consistency and other features to decide if they should be chosen for coding to the MRC foreground layers. The objects that are chosen are then clustered in color space. The image is finally segmented such that each foreground layer codes the objects from the same color cluster.

Heretofore, a number of patents and publications have disclosed aspects of image segmentation. The following patent and publication are hereby incorporated by reference in their entirety, and the relevant portions of which are briefly summarized as follows:

U.S. Pat. No. 5,767,978 to S. Revankar and Z. Fan, for an "IMAGE SEGMENTATION SYSTEM," issued Jun. 16, 1998, discloses an image rendering system for processing a stream of data in a document processing system, the stream of data including segmentable imaging data for rendering an output image, and the output image capable of being differentially rendered according to a plurality of image classes. The image rendering system includes: a segmentor for dividing the imaging data into a plurality of image regions; a selector for assigning the regions to each image class; and a processor, responsive to the selector, for differentially rendering the output image according to at least one of the plurality of image classes.

In "Background Identification Based Segmentation and Multilayer Tree Based Representation of Document Images," Proceedings of IEEE International Conference on Image Processing, ICIP Rochester, N.Y. September 2003, H. Cheng and Z. Fan teach a three-layer segmentation of objects within an image. The segmentation algorithm (BI-Seg), locates and classifies objects in an image, identifying main and local backgrounds.

MRC (Mixed Raster Content) is a powerful image representation concept in achieving high compression ratios while maintaining high reconstructed image quality. MRC has also been established as a compression standard. Within MRC, a basic three-layer model (contone foreground, contone background, and binary mask) is the most common representation form. It represents a color raster image using a background layer and a mask and foreground layer pair. The foreground and background layers are normally contone bitmaps, while the mask is usually binary. The Mask layer describes how to reconstruct the final images from the other two layers. When the Mask layer pixel value is 1, the corresponding pixel from the Foreground layer is selected for the final image; when it is 0, the corresponding pixel from the Background layer is selected.

However, MRC has the disadvantage that the resulting files, when coded in PDF, may not be able to be printed on some Postscript and PDF printers. This problem can be avoided if the foreground layer is not represented in contone form. As a result, MRC with constant foreground layers has been introduced to deal with the problem. This model contains one background layer, N foreground layers and N mask layers, where N is a non-negative integer. While the background layer can be a contone bitmap, the foreground layers are restricted to be constant colors. Although constructing this model is computationally more difficult than constructing a three-layer model, the resulting PDF file appears to be printable by all Postscript printers.

In accordance with the present invention, there is provided a method for the segmentation of a digital image for representation in a mixed raster content form with a constant foreground, comprising the steps of: extracting uniform color objects from the image; testing at least some of the extracted objects for color consistency to decide if the extracted objects should be coded to a foreground layer in the mixed raster content form; clustering, in color space, objects that are chosen for representation the foreground layer to associate objects in at least one common color cluster; and segmenting the image such that each foreground layer represents objects from the common color cluster One aspect of the invention is based on the discovery that an MRC image format may be used in a manner such that an image is identified only with a constant or common foreground color, rather than in a more traditional three-layer MRC format. This discovery avoids problems that arise in using three-level MRC formats on certain printers that are incapable of processing the format. Using the techniques set forth herein, the present invention is able to produce a representation of an image in a modified (constant foreground) format that is printable on a wider ranger of printing devices. Accordingly, the present invention enables the use of MRC formats, but does so in a manner that enables the use of installed printers to render the image. As a result of the techniques employed in accordance with the present invention, existing Postscript and PDF printing devices may continue to be employed to render MRC formatted image files.

Figure 1:
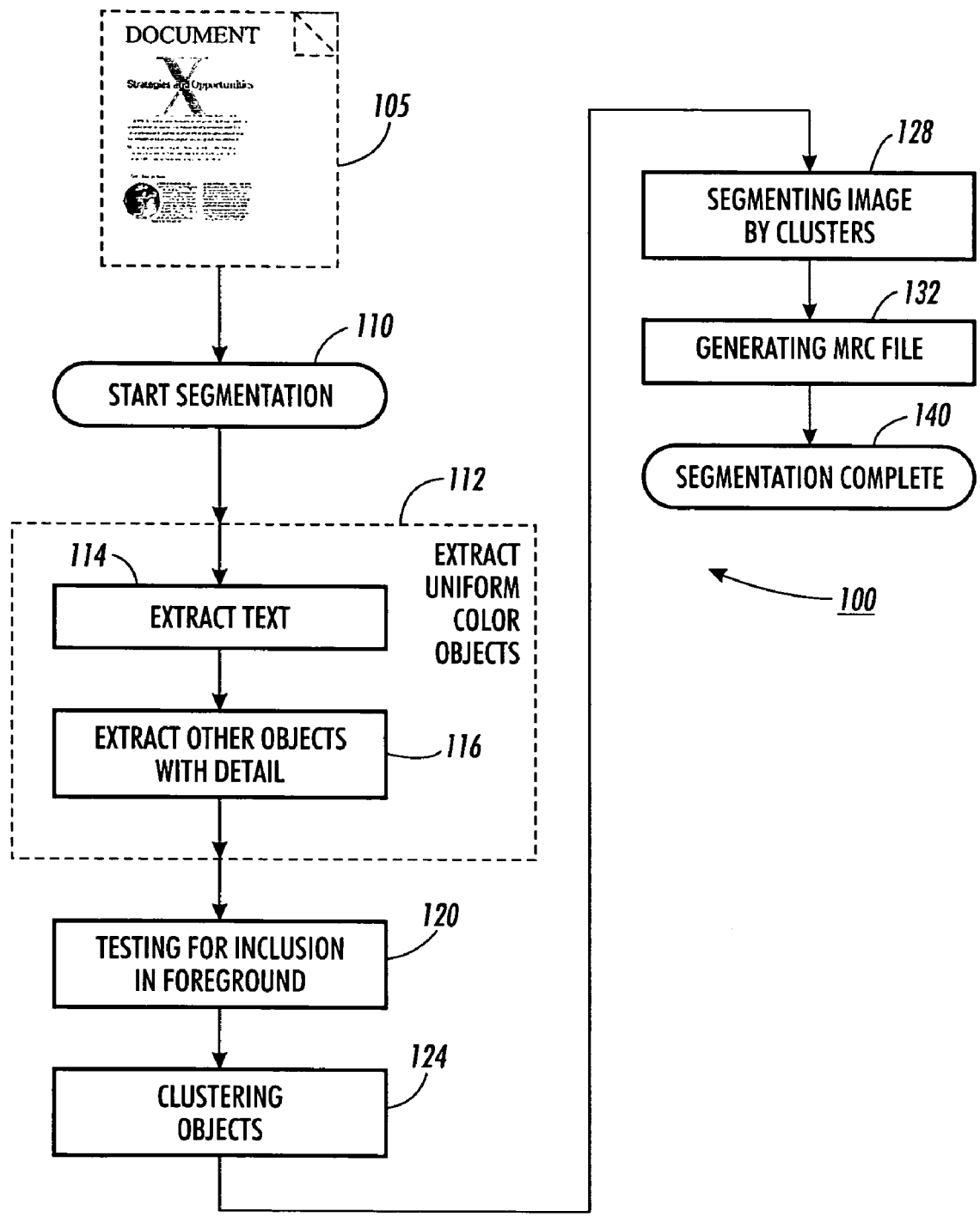
FIG. 1 is a data flow diagram depicting the methodology in accordance with the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

An "image" is a pattern of physical light. An image may include characters, words, and text as well as other features such as graphics. A text may be included in a set of one or more images, such as in images of the pages of a document. An "image set" is a set of one or more images. An image may be divided into "segments," each of which is itself an image. A segment of an image may be of any size up to and including the whole image. Each location in an image may be called a "pixel."

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A "word" is a set of one or more characters that is treated as a semantic unit in a language.

A "text" is an arrangement of one or more lines of characters; the characters of a text may form words.

An "object" is a collection of related pixels, wherein the pixels are connected or otherwise associated with one another within a connected boundary or border. An object may be a character a word or a text, a contone image or a combination or collection thereof.

An "image input terminal" (IIT) is a device that can receive an image and provide an item of data defining a version of the image. A "scanner" is an image input device that receives an image by a scanning operation, such as by scanning a document. A "digital camera" is also an image input device.

An "image output terminal" (IOT) is a device that can receive an item of data defining an image and provide the image as output. A "printer" is an image output terminal. A "display" is an image output terminal that provides the output image in human viewable form. The visible pattern presented by a display is a "displayed image" or simply "image."

In one embodiment of the present invention, the method described is intended to operate as a computer software driven system. Accordingly, one or more of the process steps described in detail below may operate on a computer platform such as a dedicated digital image processing system, a print-preprocessor or any suitable computer or workstation capable of receiving, processing and outputting image data. It will also be appreciated that such software may be program data operating on an embedded processor that also serves to provide other functionality to an associated IIT, IOT or similar or peripheral devices.

Referring to FIG. 1, there is depicted a data flow diagram illustrating the various steps in a process for segmenting a digital image in a manner suitable for representation of the image in a mixed raster content form, albeit having a constant foreground level (rather than the three-layer MRC format). As noted above, the constant foreground limitation on the MRC format enables common platform printing of the MRC files. Method 100 starts with an input digital image, likely a color image such as in a conventional .JPG or TIF format, although the image can also be presented in a continuous tone (contone) or color bitmap of pixels.

Figure 2:
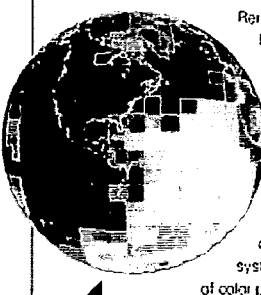
FIGS. 2 and 3 are illustrative examples of the application of the method of FIG. 1.

In the method depicted, the output desired is an MRC formatted image file with constant foreground layers. Accordingly, the process is initiated at step 110 and at step 112, the system would extract uniform color objects. As illustrated, the extraction step includes extracting text, substep 114, and other objects that carry detail information, substep 116. Referring, for example, to FIG. 2, there are depicted several "objects" within the exemplary figure, including text objects 210, and image objects 212, 214 and 216, among others.

Once extracted at step 112, the output is passed to step 120, where color consistency testing of at least some of the extracted objects occurs. The purpose of step 120 is to decide whether the extracted objects should be coded to a foreground layer in the constrained mixed raster content form. If not in the foreground, the extracted object will likely be left as a color or contone image component (e.g., JPEG contone) in the MRC format. After testing at step 120, the objects are then clustered or grouped with like-colored objects as reflected by step 124. In particular, step 124 clusters, in color space, those objects chosen for representation the foreground layers so as to associate objects in at least one common color cluster. Having clustered the extracted objects by color, it is then possible to segment the image as represented by step 128, so that each foreground layer represents objects from the common color cluster. Once the image has been segmented, it may then be recomposed or translated into an MRC-compatible format, where the segments are either indicative of a foreground region, with a specified color, or a background image region.

Having described the general nature of the present invention, attention is now turned to specific detail of the various steps indicated above. Relative to the step of extracting objects, step 112, in this step, text and other objects that carry detail information are extracted. It is known that three layer MRC segmenters, such as described by H. Cheng and Z. Fan in "Background Identification Based Segmentation and Multilayer Tree Based Representation of Document Images," incorporated above, also produce objects as their results or intermediate results. The present invention assumes that segmentation may occur in a similar fashion, or as has been disclosed in other image segmentation patent such as: U.S. Pat. No. 5,767,978 (indicated above); and the following patents which are also hereby incorporated by reference in their entiretly, U.S. Pat. No. 5,341,226 to Shiau, for "AUTOMATIC IMAGE SEGMENTATION FOR COLOR DOCUMENTS," issued Aug. 23, 1994; U.S. Pat. No. 6,549,656 to Lin for "FUZZY IMAGE SEGMENTATION," issued Apr. 15, 2003; and U.S. Pat. No. 6,295,371 to Rucklidge et al. for "METHOD AND APPARATUS FOR IMAGE PROCESSING EMPLOYING IMAGE SEGMENTATION USING TOKENIZATION," issued Sep. 25, 2001. The present invention may directly utilize such outputs with little modification.

Relative to step 120, where object selection is accomplished after testing, the objects extracted from step 112 need to be further examined. This is due to the fundamental difference between the three-layer MRC model and our constant foreground model. The former does not impose any restrictions on object color, while the latter requires that objects be coded with constant colors. To insure image quality, the test in this step selects only those objects that can be represented by a constant color without introducing significant visual artifacts.

To perform this step, a few features are calculated for each object, for example, measuring the object's color uniformity and geometric characteristics. Color uniformity can be measured by many known method. However, conventional methods may not yield the best results for this application, due to the fact that most objects are small in size and are composed of thin strokes (e.g., text in regions 212 and 214 of FIG. 2). It can be observed that small and thin objects tend to contain more edge pixels and the edge pixels of an object are frequently noisier and their colors are often a mixture of the object color and the background color. Consequently, the proposed color uniformity test tries to measure only the interior pixels or part of the object and is intended to ignore the edge pixels. In addition, the test requires less strict color uniformity for smaller and thinner objects and for objects with more contrast between object and background colors. This adjustment or variation in the test is as a result of the observation that non-uniformity is less visible for these objects. To be more specific, the uniformity measure for an object denoted k is formed as a weighted sum of the variances calculated for each color component. In evaluation of the variance, only the interior part of the object is involved. The weighting for the $c^{th}$ color component is given as:

$$Ws(k,c)=1/d(k,c)=1/[b(k,c)-o(k,c)]^2, \quad (1)$$

where b(k, c) and o(k, c) are surrounding background color and the average object color, respectively. The object is discarded if the measurement does not exceed a threshold, which is set higher for smaller and thinner objects.

Relative to Step 124, clustering, objects with similar colors are grouped together to form the clusters. The primary aspects here are: 1) how to measure color similarity; 2) how to cluster in a computationally efficient manner? As to color similarity, the same reasoning employed in the object selection applies; the color similarity measure needs to take into account that most objects will be small and thin. As a result, the color of an object is represented by the average color of its interior part. In addition, the color similarity distance between two clusters k1 and k2 (Dis (k1, k2) is a weighted norm of each color component. For example:

$$Dis(k1,k2)=\Sigma|dc(k1,k2,c)| \quad (2)$$

where summation is over color component index c and Wc is the weight given as:

$$dc(k1,k2,c)=\text{Max}[d(k1,c),d(k2,c)] \quad (3)$$

where function d( ) is defined in (1) above.

Figure 3:
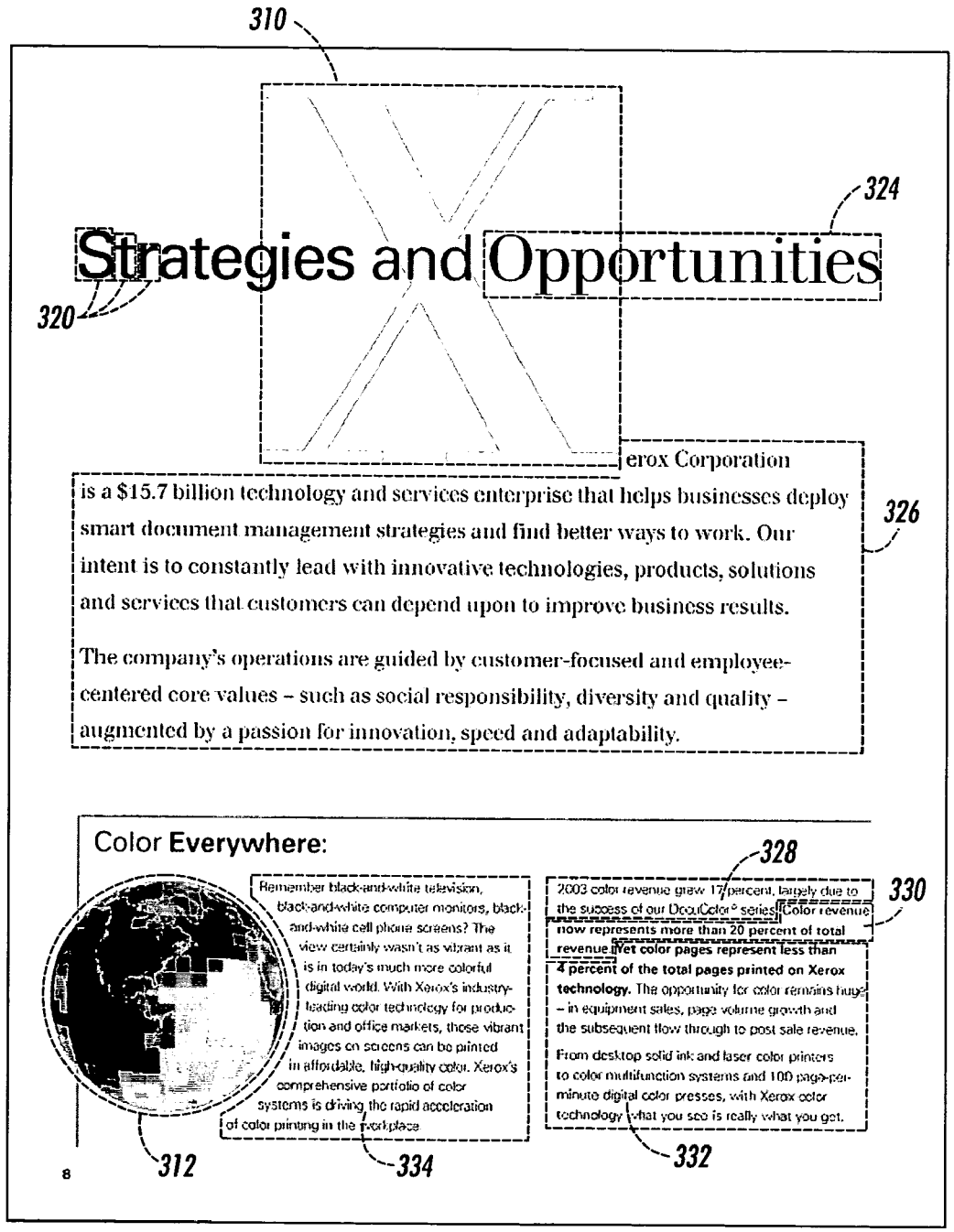

The resulting segmentation of an image allows for the image segments, to be identified and rendered using either a color over foreground, or a continuous tone image. The illustrative example of FIG. 2 is further illustrated in FIG. 3, where at least the following segments have been identified as similarly colored objects: the "X" 310; text 320, 324, 326, 328, 330, 332 and 334. It will be appreciated that the exemplary document may include alternative segmentation, for example, all of the word "Strategies" may be a single segment 320.

The number of objects in a typical document image could be very large. It can easily reach tens of thousands in a busy page full of text. The computation efficiency is therefore vital. The proposed method applies a two stage clustering algorithm which could reach almost linear complexity. It is observed that although there may be many objects and many resulting clusters, most objects belong to just a handful of larger clusters. This is due to the fact that a great number of objects are text. Most of them are printed with black color, or a limited number of colors. Based upon this observation, the first stage of the two-stage, computationally efficient, algorithm is clustering by color quantization. Specifically, objects are classified to the same initial cluster if their colors are quantized into the same color "bin." In the second stage, the initial clusters are further grouped using the distance measure given in equation (3). The first stage reduces the number of objects to be clustered from tens of thousands to typically a few hundred even with a conservative quantization. As a result, the combined complexity for the two-stage algorithm is mainly determined by the first stage, which is linear. Although the first stage may not be very accurate in clustering, the error is limited if the quantization bin size is reasonably small. In a similar manner, a predetermined limit on the number of colors to be considered for clustering could be used to impose limitations to reduce the number of clusters for an image. There is no particular requirement for the second stage clustering, and many known algorithms can serve for this purpose, for an example cluster-seeking algorithm see J. T. You, R. C. Gonzalez, "Pattern Recognition Principles", Addison-Wesley Publishing Company, 1974, pp 90-92.

It will be further appreciated that the step of clustering objects further includes testing the color of an interior portion of the object to determine whether a first extracted object should be clustered with a second extracted object. As noted, this avoids interference from edges of an object. It is also contemplated that the testing step may include a threshold, applied to the color difference, where the threshold is a function of the size of the object, such that objects of smaller size could have a larger or smaller acceptable color difference for the cluster than objects of a larger size. It is further contemplated that the threshold applied to the color difference could be a function of the difference between the colors of the clusters being considered, such that a greater difference between cluster colors will result in a larger threshold for color differences for extracted objects within a color.

Testing for inclusion in a cluster may also include comparison of the position of an extracted object relative to other objects within the cluster. Furthermore, comparison of position between objects and clusters may take into account a relationship between text characters within a text line and on other lines such that the characters within a line will have a first threshold for color differences and the characters on other lines will have a second threshold for color differences that is lower than the first threshold.

As step 132 of FIG. 1 represents, once the objects are clustered, the generation of MRC mask layers is straightforward. Each mask layer contains the objects for one cluster. The color representing the cluster can be chosen to be the average color of the objects within the cluster, or the average interior color of the objects. Although the former is better in color fidelity, the latter may enhance details, and may be more pleasing to the eye. A mixture of both may provide the best compromise. The background layer may be produced using the algorithms that are applied in three-layer models.

As described herein, the present invention may be used to identify segments of an image for further processing as well. The method described may further include altering, in response to a specified preference, at least one color for a segment of the image. For example, if at least one color is a color near black other near-black characters may simply be redefined so that at least one color is altered to equal black. Hence, the segment could be a text segment and the color for all text within the segment is set to black.

In recapitulation, the present invention is a method to produce a mixed raster content (MRC) image having constant foreground layers. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for the segmentation of a digital image for representation in a mixed raster content form with a constant foreground, comprising the steps of:

extracting uniform color objects from the image;

testing at least some of the extracted objects for color consistency to decide if the extracted objects should be coded to a foreground layer in the mixed raster content form;

clustering, in color space, objects that are chosen for representation the foreground layer to associate objects in at least one common color cluster; and segmenting the image such that each foreground layer represents objects from the common color cluster.

2. The method of claim 1, wherein said step of extracting uniform color objects includes extracting text and other objects that carry detail information.

3. The method of claim 1, wherein said step of testing for color consistency, further includes testing for other consistent features.

4. The method of claim 1, wherein said step of clustering objects further comprises testing the color of only an interior portion of the object to determine whether a first extracted object should be clustered with a second extracted object.

5. The method of claim 4, wherein said testing step comprises a thresholding operation that compares colors of objects, wherein a color difference is determined between extracted objects being compared and a threshold is then applied to the color difference to determine if the objects should be clustered.

6. The method of claim 5, wherein the threshold applied to the color difference is a function of the size of the object, such that objects of smaller size may have a greater acceptable color difference for the cluster than objects of a larger size.

7. The method of claim 5, wherein the threshold applied to the color difference is a function of the difference between the colors of the clusters being considered, such that a greater difference between cluster colors will result in a larger threshold for color differences for extracted objects within a color.

8. The method of claim 4, wherein said testing step comprises a comparison of the position of an extracted object relative to other objects within the cluster for which the object is being considered.

9. The method of claim 8, wherein said comparison of position takes into account a relationship between text characters within a line and on other lines such that the characters within a line will have a first threshold for color differences and the characters on other lines will have a second threshold for color differences that is lower than the first threshold.

10. The method of claim 1, wherein the clustering step limits the number of colors to which objects are clustered to a subset of colors in the original image.

11. The method of claim 1, wherein a color representing clustered image objects is an average of colors of objects in the cluster.

12. The method of claim 1, wherein the number of clusters is limited to a predefined number of clusters.

13. The method of claim 1, further comprising the step of altering, in response to a specified preference, at least one color for a segment of the image.

14. The method of claim 13, wherein the at least one color is a color near black and where the at least one color is altered to equal black.

15. The method of claim 14, wherein the segment is a text segment and the color for all text within the segment is set to black.

* * * * *